United States Patent
Yamamoto

(10) Patent No.: US 6,975,323 B1
(45) Date of Patent: Dec. 13, 2005

(54) VIDEO DATA TRANSFER SYSTEM

(75) Inventor: Takuro Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/067,721

(22) Filed: Apr. 28, 1998

(30) Foreign Application Priority Data

Apr. 30, 1997 (JP) ................................. 9/112117

(51) Int. Cl.$^7$ ............................................. G09G 5/36
(52) U.S. Cl. ...................... 345/545; 345/537; 345/501; 348/714
(58) Field of Search ................................ 725/151, 153, 725/139, 131, 133, 100, 65, 85; 348/569, 348/714, 552, 716, 718; 345/520, 521, 526, 345/508, 511, 545, 537, 501; H04N 7/16, H04N 7/173, 9/64; G06F 13/14, 13/16, G06F 13/00

(56) References Cited

U.S. PATENT DOCUMENTS

| | | | | |
|---|---|---|---|---|
| 5,682,522 A | * | 10/1997 | Huang et al. ................ | 345/542 |
| 5,812,125 A | * | 9/1998 | Wilkinson ................... | 345/330 |
| 5,812,204 A | * | 9/1998 | Baker et al. ................ | 348/453 |
| 5,999,196 A | * | 12/1999 | Storm et al. ................ | 345/506 |
| 6,081,279 A | * | 6/2000 | Reddy ........................ | 345/519 |

FOREIGN PATENT DOCUMENTS

| | | |
|---|---|---|
| JP | 61-147372 | 7/1986 |
| JP | 2-173819 | 7/1990 |
| JP | 3-234167 | 10/1991 |
| JP | 3-244282 | 10/1991 |
| JP | 8-146933 | 6/1996 |
| JP | 10-116064 | 5/1998 |

* cited by examiner

*Primary Examiner*—Vivek Srivastava
(74) *Attorney, Agent, or Firm*—Dickstein, Shapiro, Morin & Oshinsky, LLP.

(57) ABSTRACT

A video data transfer system which increases the rate of capturing video data into a system memory without being affected by a data bus and which prevents the display of data on a display unit from being affected even when data is being captured. Video data from a video processor 21 is sent, not via a frame buffer 14 but via a capturing-only path 26, directly to a system bus 17. This means that video data may be captured into a system memory 18 regardless of the status of a real time output path 25. On the other hand, video data is sent to a display 16 via the real time output path 25 provided independently of the capturing-only path 26. This means that video data may be sent to the display 16 at a constant rate regardless of whether or not data is being captured.

14 Claims, 3 Drawing Sheets

VIDEO DATA TRANSFER SYSTEM

FIELD OF THE INVENTION

The present invention relates to a video data transfer system, and more particularly to a video data transfer system used in a graphic accelerator having a video input function.

BACKGROUND OF THE INVENTION

FIG. 3 is a block diagram showing an example of a conventional video data transfer system. As shown in the figure, video data decoded by a video decoder 11 is sent via a video port 12 to a graphic accelerator 30 having a video input function. Upon receiving video data, the graphic accelerator 30, which comprises a video processor 21, display control circuit 22, and a FIFO memory 24, causes the video processor 21 to perform predetermined signal processing for the received video data and outputs the processed video data to a frame buffer 14 via a frame buffer data bus 13 for storage in an internal off-screen memory 15.

Video data stored in the off-screen memory 15 is usually sent to the display control circuit 22 in the graphic accelerator 30 via the frame buffer data bus 13, converted to signals suitable for display, and then sent to a display 16. The frame buffer data bus 13, the frame buffer 14, and the off-screen memory 15 constitute a real time output path 25.

At the same time, video data sent from the off-screen memory 15 via the frame buffer data bus 13 is stored temporarily in the FIFO memory 24 which is in the graphic accelerator 30 and which constitutes a path 27 via which video data is output at video capture time. The video data is then output to a system bus 17 of a computer or some other unit and sent to a system memory 18.

However, there are certain problems encountered in the course of the investigations towards the present invention. There is a problem with the conventional system described above that, because the frame buffer data bus 13 is occupied by video data to be displayed on the display 16, the frame buffer data bus 13 becomes a bottleneck of data capturing, thus reducing the capturing rate.

Conversely, while video capturing is executed, the frame buffer data bus 13 of the conventional video data transfer system described above is occupied by video data transferred to the system memory 18. This prevents video data in the off-screen memory 15 from being updated and decreases the amount of updated data to be sent to the display 16 during data capturing, thus reducing the video display rate.

SUMMARY OF THE INVENTION

The present invention seeks to solve the problems associated with the prior art described above. It is an object of the present invention to provide a video data transfer system which increases the capturing rate of video data to be sent to the system memory.

It is another object of the present invention to provide a video data transfer system which does not affect the display of data on a display even when video data is being captured.

Further objects of the present invention will become apparent in the entire disclosure.

To achieve the above object, an embodiment according to the present invention comprises a real time output path through which video data processed by a video processor is transferred to a display via a frame buffer and a capturing-only path which is independent of the real time output path and through which video data is sent to a system memory via a system bus.

According to the present invention, video data output from the video processor may be sent to the system bus through a capturing-only path, not via the frame buffer.

In addition, the real time output path through which video data is transferred to the display in real time and the capturing-only path through which video data is sent to the system memory are configured independently. This configuration prevents the display of video data on the display unit from being affected even when video data is being captured.

DETAILED DESCRIPTION

Figure 1:
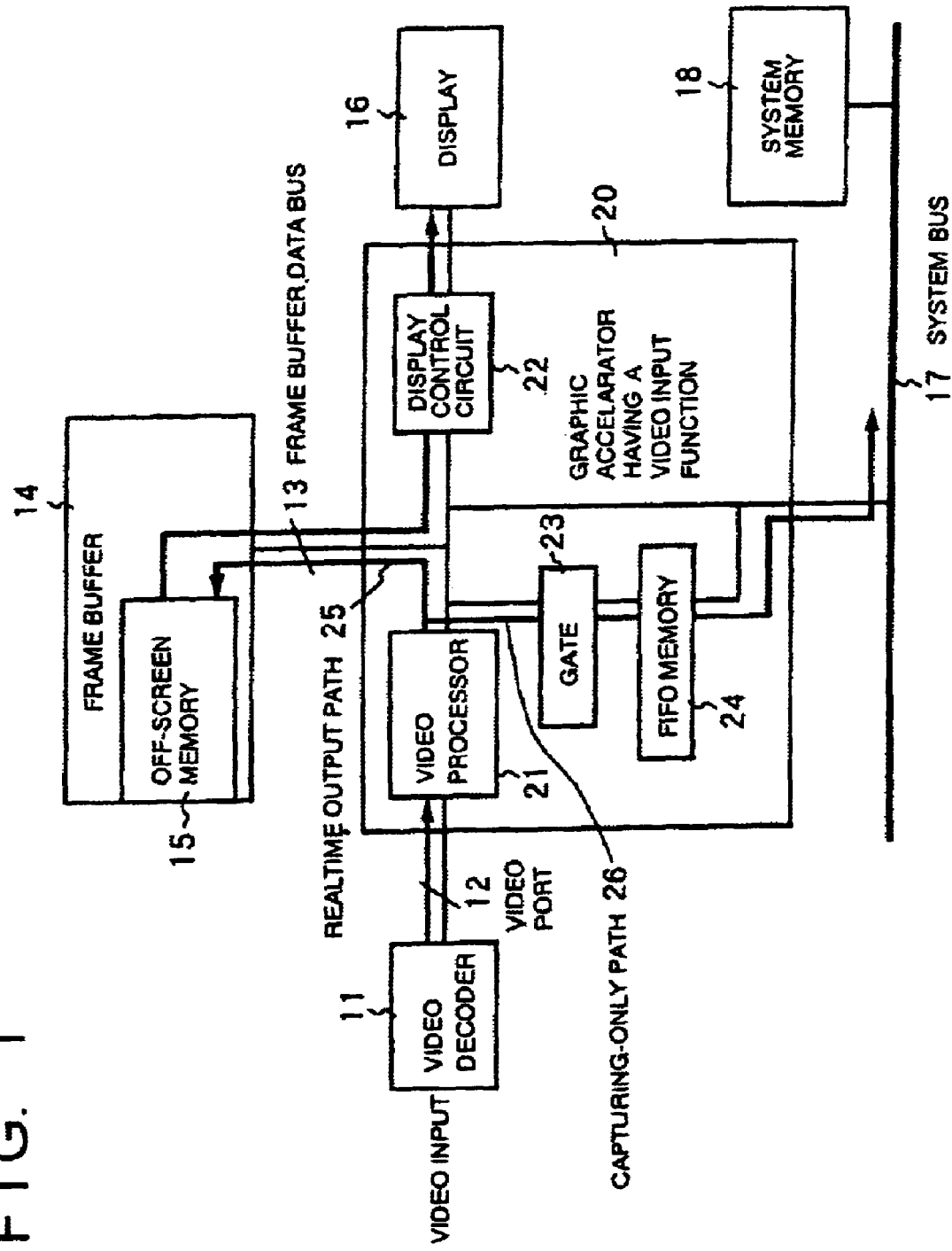
FIG. 1 is a block diagram showing a first embodiment of the present invention.

An embodiment of the present invention is described with reference to the attached drawings. FIG. 1 is a block diagram of the embodiment of the video data transfer system according to the present invention. As shown in FIG. 1, a video decoder 11 is connected via a video port 12 to a graphic accelerator 20 which has a video input function. This graphic accelerator 20 is connected to a frame buffer 14 via a frame buffer data bus 13, to a system memory 18 via a system bus 17, and to a display 16. The graphic accelerator 20 has a video processor 21, a display control circuit 22, a gate 23, and a FIFO memory 24.

This embodiment comprises the video processor 21 which processes (e.g., reduces the size of) video data received from the video decoder 11, a real time output path 25 which transfers video data from the video processor 21 to the display 16 via the frame buffer 14, and a capturing-only path 26 which transfers video data from the video processor 21 to the system memory 18.

Of these components, the real time output path 25 comprises the frame buffer data bus 13 via which video data from the video processor 21 is sent to the frame buffer 14, the frame buffer 14 in which all image data including video data is stored, an off-screen memory 15 which is in the frame buffer 14 and in which video data is stored, and the display control circuit 22 which enlarges or interpolates video data to control the output timing for display.

On the other hand, the capturing-only path 26 comprises the gate 23 which controls capturing and the FIFO (first-in, first-out) memory 24 in which video data is stored.

Figure 2:
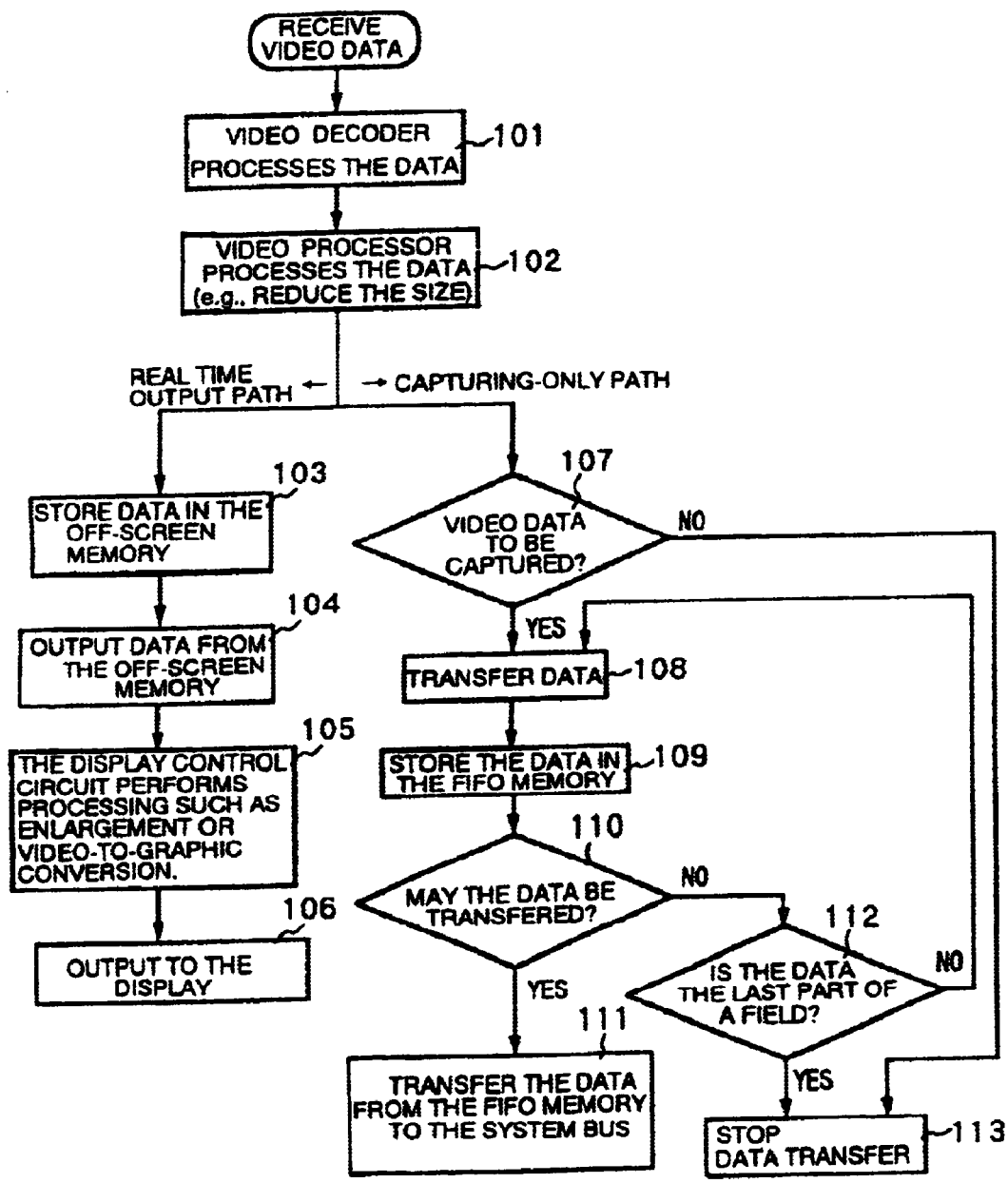
FIG. 2 is a flowchart explaining an operation of the embodiment of FIG. 1.
Figure 3:
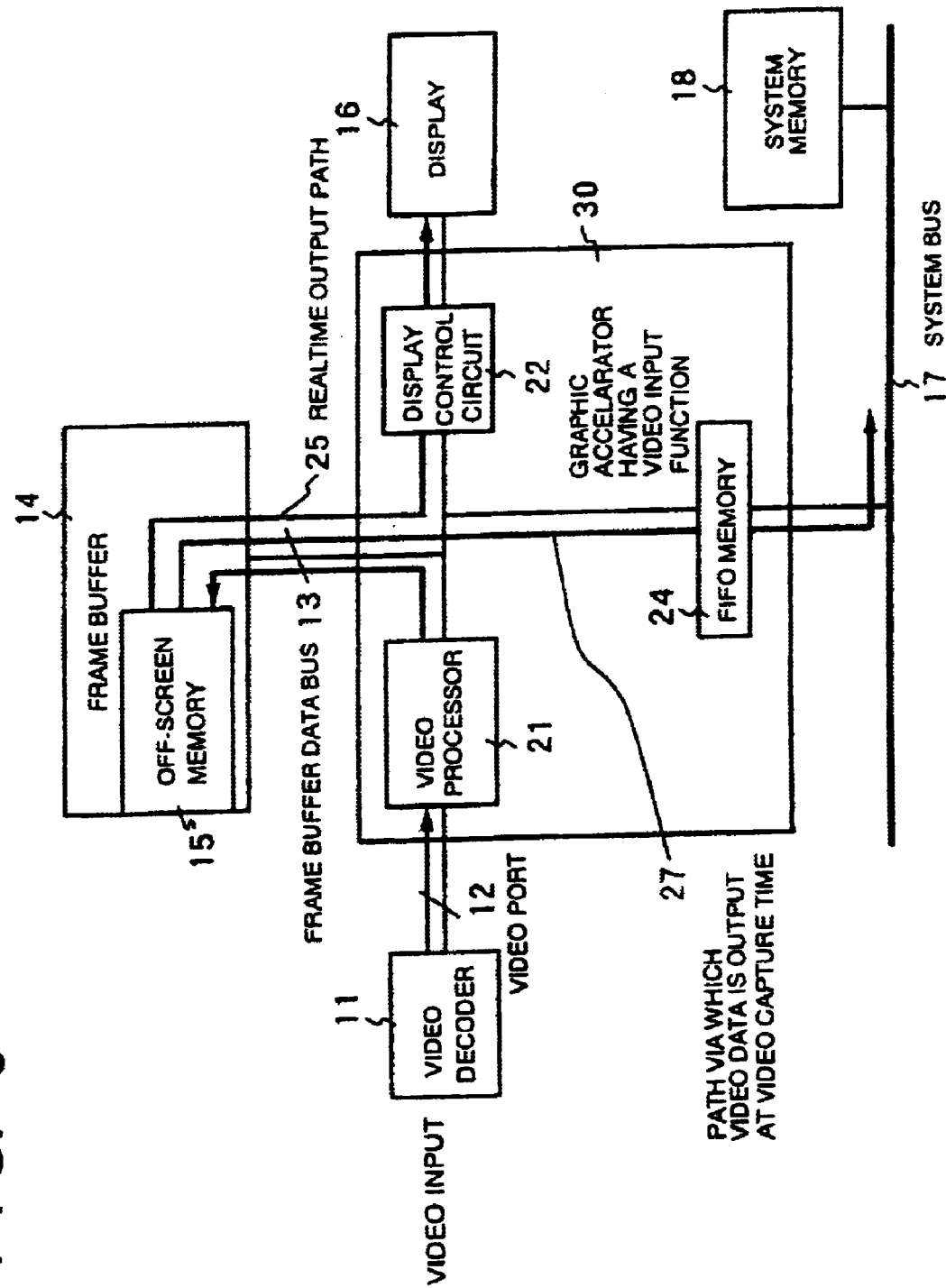
FIG. 3 is a block diagram of an example of a conventional system.

The operation of this embodiment is described with reference to the flowchart shown in FIG. 2. First, video data processed by the video decoder 11 (step 101) is input to the video processor 21 which performs such processing as size reduction (step 102). Then, control is passed to one of two paths: real time output path 25 and capturing-only path 26.

Video data sent to the real time output path 25 is stored in the off-screen memory 15 in the frame buffer 14 (step 103), read from the off-screen memory 15 (step 104), sent to the display control circuit 22 for enlargement or video-to-graphic conversion (step 105), and sent to the display 16 for real time display (step 106).

On the other hand, the system checks video data sent to the capturing-only path 26 if the video data is to be captured (step 107). If the video data is not to be captured, the system closes the gate 23 to prevent the video data from being sent (step 113). If the video data is to be captured, the system opens the gate 23 to allow the video data to be sent (step 108) and stores the video data in the FIFO memory 24 (step 109).

Then, the system checks the video data if it may be transferred to the system bus 17 (step 110). If the video data may be transferred, it is transferred to the system bus 17 and stored in the system memory 18 (step 111). If, in step 110, the system determines that the video data may not be transferred to the system bus 17 for some reason, the system checks the vertical synchronization signal data to see if the video data is the last part of a field (step 112). If the video data is not the last part of a field, the system transfers the next data to the FIFO memory 24 (steps 108 and 109); if the video data is the last part of a field, the system closes the gate 23 to stop data transfer and suspends frame capturing (step 113).

As described above, video data from the video processor 21 is sent, not via the frame buffer 14 but via the capturing-only path 26, directly to the system bus 17. This means that video data may be captured into the system memory 18 regardless of the status of the real time output path 25.

On the other hand, video data is sent to the display 16 via the real time output path 25 provided independently of the capturing-only path 26. This means that video data may be sent to the display 16 at a constant rate regardless of whether or not data is being captured.

EMBODIMENT

The configuration of the embodiment according to the present invention is detailed with reference to FIG. 1. The graphic accelerator 20 with a video input function is implemented as a large scale integrated circuit (LSI). It comprises the video processor 21 which reduces the size of video data according to the YUV 16 bits, the real time output path 25 which is a 64-bit internal bus through which video data from the video processor 21 is sent to the display control circuit 22 via the frame buffer 14, and the capturing-only path 26 which is a 32-bit internal bus through which video data from the video processor 21 is sent to the FIFO memory 24 via the gate 23.

The real time output path 25 comprises the 64-bit frame buffer data bus 13, the 2M-byte to 4M-byte frame buffer 14 in which image data including video data is stored, the variable-length off-screen memory 15 which is in the frame buffer 14 and in which video data is stored, and the display control circuit 22 which switches data from video data to graphic image data and vice versa, enlarges video data according to a display size, performs interpolation, and converts analog RGB signals from digital to analog and vice versa.

On the other hand, the capturing-only path 26 comprises the gate 23 that enables/disables the FIFO memory 24, and the 32-bit-by-640-stage (YUV 16 bits, 2 lines of video data) FIFO memory 24.

The operation of the embodiment according to the present invention is described with reference to FIGS. 1 and 2. Upon receiving NTSC analog video signals, the video decoder 11 converts the video signals to YUV 16-bit digital video data (step 101), sends the converted video data to the video processor 21, and reduces the size of video data according to the display size (step 102). Video data from the video processor 21 is sent to one of two paths: real time output path 25 and capturing-only path 26.

Video data sent to the real time output path 25 is once stored in the off-screen memory 15 (step 103). The video data is then read from the off-screen memory 15 (step 104) and sent to the display control circuit 22 where the video data is processed in many ways. For example, enlargement, interpolation (conversion of interlace-compatible YUV 16-bit image data to non-interlace compatible image data), switching from video data to and from graphic data, and digital/analog signal conversion to produce analog RGB signals (step 105). Video data converted to analog RGB signals are output to the display 16 for display.

On the other hand, video data sent to the capturing-only path 26 is checked to see if the video data is to be captured (step 107). If the video data is not to be captured, the gate 23 is closed to stop data transfer (step 113). If the video data is to be captured, a FIFO memory control circuit in the gate 23 sends the enable signal to the FIFO memory 24 to store video data in the FIFO memory 24 (steps 108, 109).

Then, the system checks if the system bus 17 of the computer such as a PCI bus is being used by some other unit in the computer (step 110). If the PCI bus is not being used by any other unit in the computer, the video data is sent from the FIFO memory 24 to the system memory 18 of the computer system via the PCI bus (step 111).

When the PCI bus is being used by some other unit in the computer system, the system checks to see if the video data in the FIFO memory 24 contains the field delimiter (step 112). If the video data contains the field delimiter, the system stops sending video data (step 113) at this point; if the video data does not contain the field delimiter, the system passes control back to step 108 to transfer the next video data to the FIFO memory 24.

Video data is sent to the FIFO memory 24 (step 109), stored there for a while, and then output (step 110). The FIFO memory 24, which has a constant input bandwidth of about 18 Mbps and the maximum output bandwidth of 132 Mbps, does not overflow during normal operation. In step 112, the presence of the frame delimiter, rather than the field delimiter, may be checked.

As described above, video data from the video processor is sent to the system bus not via the frame buffer. This means that video data may be captured into the system memory regardless of the status of the real time output path including the frame buffer. This increases the rate of capturing video data into the system memory.

On the other hand, the embodiment according to the present invention has two independent paths configured: one is the real time output path via which video data is transferred to the display in real time and the other is the capturing-only path via which video data is transferred to the system memory. This configuration prevents the display of data on the display unit from being affected even when data is being captured. That is, the system keeps on sending video data to the display at a constant rate regardless of whether or not data is being captured, preventing data transfer to the display from being interrupted when data is being captured.

What is claimed is:

1. A video data transfer system comprising:
    a real time output path through which video data processed by a video processor is sent to a display via a frame buffer;
    a capturing path which is independent of said real time output path and through which said video data is sent to a system memory via a system bus and not through the frame buffer; and
    a gate in said capturing path, said gate being controllable to permit said video data to pass when received from said video processor, wherein a rate at which said video data is sent to the display is unaffected by passage of said video data through said capturing path.

2. A video data transfer system, comprising:

a real time output path through which video data processed by a video processor is sent to a display via a frame buffer;

a capturing path which is independent of said real time output path and through which said video data is sent to a system memory via a system bus and not through the frame buffer, wherein said real time output path comprises:

an off-screen memory which receives video data from said video processor via a data bus and stores video data therein, said off-screen memory being in the frame buffer; and a display control circuit which receives video data read from said off-screen memory via said data bus for enlargement and interpolation processing and transfers processed results to said display, and wherein said capturing path comprises:

a gate which is opened only when video data is received from said video processor for capturing; and memory means for storing said video data sent through said gate and for transferring said video data to said system bus, wherein a rate at which said video data is sent to the display is unaffected by passage of said video data through said capturing path.

3. A video data transfer system as defined in claim 2, wherein said memory means transfers said stored video data to said system bus when said system bus is not occupied by some other unit and, when said system bus is occupied by some other unit, checks if said stored data contains a field delimiter or a frame delimiter and closes said gate to stop data transfer when said stored data contains the delimiter and, when said stored data does not contain the delimiter, stores the next video data passing through said gate.

4. A video data transfer system as defined in claim 1, further comprising:

a capture path memory in said capturing path;

said capture path memory being connected to said gate; and said capture path memory being operable to store said video data passed by said gate.

5. A video data transfer system as defined in claim 4, wherein said capture path memory is further effective to transfer said video data to said system bus.

6. A video data transfer system as defined in claim 5, wherein said real time output path further comprises:

an off-screen memory effective to receive said video data from said video processor via a data bus and store said video data therein; and wherein said off-screen memory is in said frame buffer.

7. A video data transfer method, comprising:

providing video data from a video processor to a plurality of paths independent of each other;

sending said video data to a display through a frame buffer in at least one of said independent paths operating as a real time output path;

sending said video data to a system memory through a system bus and not through the frame buffer in at least another of said independent paths operating as a capture path; and controlling said capture path to permit said video data to pass to said system memory when said video data is to be captured, wherein a rate at which said video data is sent to the display is unaffected by passage of said video data through said capture path.

8. A video data transfer method as defined in claim 7, further comprising storing said video data in a capture path memory in said capture path when said video data is permitted to pass to said system memory.

9. A video data transfer method as defined in claim 8, further comprising checking said system bus for occupation by other devices connected thereto.

10. A video data transfer method as defined in claim 9, further comprising transferring said video data from said capture path memory to said system memory when said system bus is not occupied by other devices connected thereto.

11. A video data transfer method as defined in claim 10, further comprising checking said video data stored in said capture path memory for at least one of a field and a frame delimiter when said system bus is occupied.

12. A video data transfer method as defined in claim 11, further comprising controlling said capture path to prevent said video data from being stored in said capture path memory when said capture path memory contains said at least one of a field and a frame delimiter.

13. A method of transferring video data, the method comprising:

receiving video data;

determining whether the video data is to be captured;

processing the video data to produce processed data;

forwarding the processed video data to a first path, the first path including a display control circuit and a frame buffer; and forwarding the processed video data to a second path when the determining indicates that the video data is to be captured, the second path not including the frame buffer;

wherein the first and second paths are distinct, and wherein a rate at which the video data is sent to a display controlled by the display control circuit is unaffected by passage of the video data through the second path.

14. A video data transfer system comprising:

a video processor which receives video data and processes the video data to produce processed video data;

a display path coupled to the video processor, the display path including a frame buffer, the display path conveys the processed video data from the video processor to a display; and a capturing path coupled to the video processor, the capturing path conveys the processed data from the video processor to a system memory, the capturing path not including the frame buffer, the capturing path being distinct from the display path, wherein a rate at which said video data is sent to the display is unaffected by passage of said video data through said capturing path.

* * * * *